United States Patent
Cozewith et al.

(10) Patent No.: US 6,319,998 B1
(45) Date of Patent: Nov. 20, 2001

(54) METHOD FOR MAKING POLYMER BLENDS BY USING SERIES REACTORS

(75) Inventors: Charles C. Cozewith, Bellaire; Sudhin Datta; Bruce A. Harrington, both of Houston, all of TX (US); Bernard J. Folie, Brussels (BE); John F. Walzer, Jr., Seabrook; Donna J. Crowther, Baytown, both of TX (US)

(73) Assignee: Exxon Mobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/260,787

(22) Filed: Mar. 1, 1999

Related U.S. Application Data
(60) Provisional application No. 60/076,712, filed on Mar. 4, 1998.

(51) Int. Cl.$^7$ .................................................... C08F 2/06
(52) U.S. Cl. ........................ 526/65; 526/127; 526/282; 526/283; 526/335; 515/53
(58) Field of Search .................................... 526/158, 323, 526/268, 321, 189, 901, 943, 95, 127, 351; 65/160, 170, 348.6, 904; 502/121, 123, 124, 125; 525/240, 64, 91, 94, 95, 96, 98

(56) References Cited

U.S. PATENT DOCUMENTS

| | | |
|---|---|---|
| 3,378,606 | 4/1968 | Kontos . |
| 3,629,212 | 12/1971 | Benedikter et al. . |
| 3,853,969 | 12/1974 | Kontos . |
| 3,969,470 | 7/1976 | Spiegelman ..................... 260/897 A |
| 4,016,342 | 4/1977 | Wagensommer . |
| 4,306,041 | 12/1981 | Cozewith et al. . |
| 4,433,121 | 2/1984 | Kabu et al. ............................ 526/68 |
| 4,742,106 | 5/1988 | Kamiya et al. . |
| 4,774,292 | 9/1988 | Thiersault et al. . |
| 4,966,944 | 10/1990 | Kiang . |
| 5,026,798 | 6/1991 | Canich ................................. 526/127 |
| 5,132,262 | 7/1992 | Rieger et al. ........................ 502/117 |
| 5,239,022 | 8/1993 | Winter et al. . |
| 5,391,618 | 2/1995 | Yamamoto et al. . |
| 5,464,906 | 11/1995 | Patton et al. ........................ 525/240 |
| 5,478,898 | 12/1995 | Standaert . |
| 5,504,172 | 4/1996 | Imuta et al. . |
| 5,599,885 | 2/1997 | Kawasaki et al. ..................... 526/68 |
| 5,696,213 | 12/1997 | Schiffino et al. . |
| 5,700,896 | 12/1997 | Dolle et al. . |
| 5,708,090 | 1/1998 | Schreck et al. . |
| 5,710,219 | 1/1998 | Bates et al. . |
| 5,753,773 | 5/1998 | Langhauser et al. . |
| 5,990,242 | 11/1999 | Naga et al. . |

FOREIGN PATENT DOCUMENTS

| | | |
|---|---|---|
| 2157399 | 10/1995 | (CA) . |
| 4317655 | 12/1994 | (DE) . |
| 4317655 A | 12/1994 | (DE) . |
| 19722104 | 12/1997 | (DE) . |
| 19722104 A | 12/1997 | (DE) . |
| 0 067 525 | 12/1982 | (EP) . |
| 366411 | 5/1990 | (EP) . |
| 0 416 379 | 3/1991 | (EP) . |
| 433989 | 6/1991 | (EP) . |
| 686649 | 12/1995 | (EP) . |
| 704462 | 4/1996 | (EP) . |
| 0 714 923 | 6/1996 | (EP) . |
| 389611 B1 | 6/1997 | (EP) . |
| 1200 362 | 7/1970 | (GB) . |
| H4-337308 | 11/1992 | (JP) . |
| 92/15619 | 9/1992 | (WO) . |
| 93/13143 | 7/1993 | (WO) . |
| 94/17112 | 8/1994 | (WO) . |
| WO 94/21700 | 9/1994 | (WO) . |
| 96/33227 | 10/1996 | (WO) . |
| WO 97/36942 | * 10/1997 | (WO) . |
| 97/36942 | 10/1997 | (WO) . |
| 98/02471 | 1/1998 | (WO) . |

* cited by examiner

Primary Examiner—David W. Wu
Assistant Examiner—William Cheung
(74) Attorney, Agent, or Firm—Anthony Chi; Stephen D. Prodnuk

(57) ABSTRACT

This invention relates to a method of making polymer blends using series reactors and a metallocene catalyst. Monomers used by the invention are ethylene, a higher alpha-olefin (propylene most preferred), and optionally, a non-conjugated diene (ethylidene norbornene, i.e., ENB, most preferred). More specifically, this invention relates to making blends of EP (ethylene-propylene) copolymers in which the blend components differ in any of the following characteristics: 1) composition 2) molecular weight, and 3) crystallinity. We use the terminology EP copolymer to also include terpolymers that contain varying amounts of non-conjugated diene. Such terpolymers are commonly known as EPDM.

52 Claims, No Drawings

METHOD FOR MAKING POLYMER BLENDS BY USING SERIES REACTORS

This application claims benefit to Provisional Application 60/076,712 filed Mar. 4, 1998.

BACKGROUND OF THE INVENTION

This invention relates to a method of making polymer blends using series reactors and a metallocene catalyst. Monomers used by the invention are ethylene, a higher alpha-olefin (propylene most preferred), and optionally, a non-conjugated diene (ethylidene norbornene, i.e., ENB, most preferred). More specifically, this invention relates to making blends of EP (ethylene-propylene) copolymers in which the blend components differ in any of the following characteristics: 1) composition 2) molecular weight, and 3) crystallinity. We use the terminology EP copolymer to also include terpolymers that contain varying amounts of non-conjugated diene. Such terpolymers are commonly known as EPDM.

There are various advantages for making the aforementioned blends. For example, EP (ethylene propylene copolymer) and EPDM (ethylene propylene diene terpolymer) polymers are often used as blends of two or more polymers to obtain optimum polymer properties for a given application. High molecular weight and low molecular weight polymers are blended yielding a broadened molecular weight distribution (MWD) and therefore better processibility than a narrow MWD polymer with the same average molecular weight. A semicrystalline polymer may be blended with an amorphous polymer to improve the toughness (green strength) of the amorphous component at temperatures below the semicrystalline polymer melting point. Higher green strength polymers are less likely to cold flow and give improved handling characteristics in processing operations such as calendering and extrusion.

One method of making the aforementioned blends is by mixing two different polymers after they have been polymerized to achieve a target set of properties. Such a method is expensive making it much more desirable to make the blends by direct polymerization. Blends by direct polymerization are well known in the prior art such as EPDM manufacture with soluble vanadium based Ziegler-Natta catalysts by using reactors in series and making a polymer with different properties in each reactor. Patents which show vanadium in series reactor operation are U.S. Pat. No. 3,629,212, U.S. Pat. No. 4,016,342, and U.S. Pat. No. 4,306,041, all of which are incorporated by reference for purposes of U.S. patent practice.

Although polymer blending may be performed by vanadium based Ziegler-Natta catalysts in series reactors, there are severe limitations on the amount and characteristics of the polymers that can be made in each reactor, especially in the second reactor. Due to economical considerations, the most preferred method of reactor operation is to add catalyst only to the first reactor to minimize the use of the expensive catalyst components. Because of the rapid deactivation rate of the active vanadium species, catalyst concentration is very low in the second reactor in the series and would be even lower in succeeding reactors. As a result, it is very difficult to make more than about 35 wt % of the total polymer in the second reactor. Also, the low catalyst concentration may put limits on the composition or molecular weight of the polymer. To cure this problem, catalyst activators or additional catalyst can be added to the second and later reactors; however, this raises manufacturing costs.

Furthermore, vanadium catalysts are limited in their ability to produce polymers containing less than about 35 wt % ethylene since they much more readily polymerize ethylene than propylene or higher alpha-olefins. In addition, soluble vanadium catalysts are incapable of producing copolymers and terpolymers that contain crystallinity due to the presence of long sequences of isotactic polypropylene.

SUMMARY OF THE INVENTION

This invention departs from the prior art by providing a process for producing polymer blends in series reactors that cures the problems of prior art processes associated with property limits. Note that the terms "multi-stage reactor" and "series reactor" are used interchangeably herein. By employing metallocene catalysts, which enjoy a long catalyst lifetime, polymer blends can be made that vary in the amount of the components, the composition of the components, and the molecular weight of the components over much wider ranges than obtainable with prior art vanadium catalysts. In particular, it is the objective of this invention to use a series reactor process and produce the following types of blends: a) blends in which the ethylene content of the polymer made in the first and second reactors differ by 3–75 wt % ethylene, and b) blends in which the MWD of the blend is characterized by Mw/Mn=2.5–20 and Mw/Mn for the individual blend components is 1.7–2.5, and c) blends in which both the polymer composition and MWD meet the criteria in items a) and b) above, and d) blends in which one component contains 0 to 20 wt % ethylene, is semicrystalline due to the presence of isotactic propylene sequences in the chain, and has a melting point of 40–160° C., and the other component is amorphous, and e) blends in which one component contains 60 to 85 wt % ethylene, is semicrystalline due to the presence of long ethylene sequences in the chain, and has a melting point of 40–120° C., and the other component is amorphous.

This series reactor polymer blend is used in the dynamic vulcanization process to provide improved thermoplastic elastomer products.

Polymerization is preferably homogeneous solution polymerization. The catalyst is a cyclopentadienyl metallocene complex which has two Cp ring systems for ligands or monocyclopentadienyl metallocene catalyst. The metallocene complexes are activated with an alumoxane, e.g. methylalumoxane (MAO) or a non-coordinating anion (NCA) described further below. Optionally, a trialkyl aluminum scavenger may be added to the reactor feed(s) to prevent deactivation of catalyst by poisons. The reactors are preferably liquid filled, continuous flow, stirred tank reactors. The method employs two or more continuous flow, stirred tank reactors in series with two reactors as a preferred embodiment. Solvent and monomers are fed to each reactor, and preferably catalyst is fed only to the first reactor. Reactors are cooled by reactor jackets or cooling coils, autorefrigeration, prechilled feeds or combinations of all three. Autorefrigerated reactor cooling requires the presence of a vapor phase in the reactor. Adiabatic reactors with prechilled feeds are preferred. This gives rise to a temperature difference between reactors which is helpful for controlling polymer molecular weight. Monomers used in the process are ethylene and a C3–C8 higher alpha-olefin. Propylene is the most preferred as a higher alpha-olefin. Monomers may also optionally include a non-conjugated diene in which case ENB (5-ethylidene-2-norbornene) is the most preferred diene. Reactor temperature depends upon the effect of temperature on catalyst deactivation rate and polymer properties. For economic reasons, it is desirable to operate at as high a temperature as possible; however, temperatures should not exceed the point at which the concentration of catalyst in the second reactor is insufficient to make the desired polymer component in the desired amount. Therefore, temperature will be determined by the details of the catalyst system. In general, the first reactor temperature can vary between 0–110° C. with 10–90° C. preferred and 20–70° C. most preferred. Second reactor temperatures will vary from 40–160° C. with 50–140° C. preferred and 60–120° C. most preferred.

When two reactors are used in series, the composition of the polymer made in the first reactor is 0–85 wt % ethylene while the composition of the polymer made in the second reactor polymer is 0–85 wt % ethylene. The average composition of the polymer blend is 6–85 wt % ethylene.

If Mw/Mn for the blend is less than 2.5, then the difference in composition between the polymer produced in the first and second reactors is 3–75% ethylene, preferably 5–60% ethylene, and most preferably, 7–50% ethylene. If Mw/Mn for the blend is equal to or greater than 2.5, then the composition of the blend components can be either the same or different.

In another embodiment, the difference in ethylene content between the two components is such that one is semi-crystalline and the other is amorphous. Semi-crystalline is defined as having a melting point as measured by DSC and a heat of fusion of at least 10 J/g while amorphous is defined as either the absence of a DSC melting point or a heat of fusion of less than 10 J/g. The semicrystalline polymers of this invention generally have melting points of about 40–160° C. depending on the polymer composition. DSC measurements are made by the procedure described in the Examples section. Ethylene propylene copolymers are generally amorphous at ethylene contents between 20 and 60 wt % with the catalysts of this invention. If a polymer component with ethylene crystallinity is desired in the blend, this should have in excess of 60 wt % ethylene. On the other hand, if a component is desired with propylene crystallinity, it should have less than about 20 wt % ethylene. Furthermore, in this case, it is necessary to use a catalyst system that is capable of polymerizing propylene stereospecifically. Catalyst systems that produce isotactic propylene sequences are most preferred.

Depending on the crystallinity level of the semi-crystalline component and the composition difference between the components, the two components may be immiscible and form a phase separated mixture following recovery of the product from the reactor. The presence of multiple phases can readily be measured by standard polymer characterization techniques such as light microscopy, electron microscopy, or atomic force microscopy (AFM). Two phase polymer blends often have advantageous properties, and it is a particular objective of this invention to produce such two phase blends by direct polymerization.

When two reactors are used in series, the amount of polymer made in the second reactor is 15–85 wt % of the total polymer made in both reactors, preferably 30–70 wt % of the total polymer made in both reactors.

MWD of the polymers made with metallocene catalysts tends to be narrow (Mw/Mn<2.5), and as a result the polymers do not in general have good processing characteristics. It is a particular objective of this invention that the polymers made in the first and second reactors be of sufficiently different molecular weight so that MWD is broadened. Mw/Mn of the final product is preferably 2.5–20.0 and most preferably 3.0–10.0.

Diene content in the polymer can range from 0–15 wt %, preferably from 2–12 wt % and most preferably from 3–10 wt %. Diene levels in the polymer made in each reactor can be the same or different. Copolymer/terpolymer blends can be made by the process of the invention. For example, if diene is added only to the second reactor, a copolymer of ethylene and propylene can be made in the first reactor while a terpolymer of ethylene, propylene, and diene may be made in the second reactor.

A preferred embodiment of the invention is operating series reactors to produce blends in which the composition of the blend components differs by at least 3 wt % ethylene, Mw/Mn for the blend is equal to or greater than 2.5, and one of the blend components is semi-crystalline. Another preferred feature is that the semicrystalline polymer contain isotactic polypropylene crystallinity.

For a blend combining all of the inventive features described above, at a given average ethylene content and molecular weight for the final product, polymer properties will vary depending on the composition and molecular weight of each component. The process of the invention is capable of making blends in which either: a) polymer 1 has higher ethylene content and higher molecular weight than polymer 2, or b) polymer 1 has higher ethylene content and lower molecular weight than polymer 2. Polymer 1 and polymer 2 can be made in either the first or the second reactor.

For terpolymerization, the blends can further be distinguished by the diene level in each component. Typically, it is preferred to have a higher diene content in the lower molecular weight component to give optimal product properties in vulcanized thermoset compounds.

The present invention may be summarized as a method of making a polymer blend by solution polymerization comprising: a) feeding a first set of monomers and a solvent in predetermined proportions to a first reactor, b) adding a metallocene catalyst to the first reactor, c) operating the first reactor to polymerize the first set of monomers to produce an effluent containing a first polymer, d) feeding the effluent of c) to a second reactor, e) feeding a second set of monomers in predetermined proportions to the second reactor with optional additional solvent, f) operating the second reactor to polymerize the second set of monomers to produce a second polymer without introduction of any substantial amount of catalyst. Thus, preferably greater than 50 wt % of the total amount of catalyst added to all reactors is added to the first reactor, more preferably greater than 75 wt %, and most preferably 100 wt % of the total amount of catalyst added to all reactors is added to the first reactor. The first and second set of monomers is chosen from a group consisting of ethylene, higher alpha-olefin and non-conjugated diene. The preferred higher alpha-olefin is propylene and the preferred non-conjugated diene is chosen from the group consisting of 5-ethylidene-2-norbornene (ENB), 1,4-hexadiene, dicyclopentadiene (DCPD), norbornadiene, and 5-vinyl-2-norbomene (VNB), with ENB most preferred.

A non-conjugated diene may be added to the first set of monomers and/or the second set of monomers in an amount so that the diene content in the polymer blend is preferably from 0–15 wt %, more preferably 2–12 wt %, and most preferably 3–10 wt %.

Control of Ethylene Content

Monomer proportions may be controlled to yield various polymer blends with the blend components having different ethylene content. For example, the monomer proportions in the first reactor and the second reactor may be controlled so that the ethylene content of the first and second polymers differs by 3–75 wt %. Additionally, the monomer proportions in the first reactor and the second reactor may be controlled so that the first polymer has 0 to 85 wt % ethylene, the second polymer has 0 to 85 wt % ethylene, and the polymer blend has 6 to 85 wt % ethylene. Preferably, a blend of semi-crystalline and amorphous polymer is achieved by controlling the monomer proportions in the first reactor and the second reactor so that the ethylene content of the first and second polymers differ so that either: a) the first polymer is semi-crystalline and the second polymer is amorphous, or b) the first polymer is amorphous and the second polymer is semi-crystalline.

Control of Molecular Weight Distribution (MWD)

Preferably, molecular weight of the blend components is controlled to produce a polymer product with a broader MWD than that of the individual components. Specifically, the molecular weight of the first or second polymer or both polymers may be controlled by at least one of: a) adding a chain transfer agent to the first or second reactor or both reactors, b) operating the first and second reactors adiabatically with a temperature difference between the reactors. When broadened MWD is desired, preferably, the molecular weight of the first or second polymer or both polymers is controlled so that the first and second polymers have a Mw/Mn of 1.7–2.5 while the polymer blend has a Mw/Mn of 2.5–20. Most preferably, the molecular weight of the first or second polymer or both polymers is controlled so that the first and second polymers have a Mw/Mn of 1.7–2.5 while the polymer blend has a Mw/Mn of 3.0–10.0. When a narrow MWD product is desired for a particular application the molecular weight of the first or second polymer or both polymers is controlled so that the polymer blend has a Mw/Mn of less than 2.5.

When molecular weight distribution is broadened, it is necessary that one component of the blend be a higher molecular weight than another component of the blend. Thus, the molecular weight of the first or second polymer or both polymers is controlled so that either: a) the first polymer has a higher molecular weight than the second polymer or b) the first polymer has a lower molecular weight than the second polymer. The Mw of each component can be in the range of 10,000 to 2,000,000, preferably in the range of 25,000 to 1,000,000, and most preferably in the range of 50,000 to 500,000.

This series of reactor blend polymers can be further dynamically vulcanized to provide thermoplastic vulcanization.

Control of both ethylene content and MWD

It is also possible to jointly control both ethylene content and molecular weight. When molecular weight is controlled to yield a blend where one component is of higher molecular weight than another, it is preferable to control the ethylene content of each component. Thus the monomer proportions in the first reactor and the second reactor may be controlled so that: a) if the first polymer has a higher molecular weight then the first polymer has a higher ethylene content compared to the second polymer, or b) if the first polymer has a lower molecular weight then the first polymer has a lower ethylene content compared to the second polymer. Furthermore, the monomer proportions in the first reactor and the second reactor may be controlled so that: a) if the first polymer has a higher molecular weight, then the first polymer has a lower ethylene content compared to the second polymer, or b) if the first polymer has a lower molecular weight, then the first polymer has a higher ethylene content compared to the second polymer.

As shown by the preceding disclosure, by practicing the process of this invention, polymer blends can be obtained with various combinations of composition distribution breadth, molecular weight distribution breadth, or both together. If polymer blend component molecular weight is controlled to maintain Mw/Mn for the final product at 2.5 or less, it is preferable that the monomer proportions in the first reactor and the second reactor are controlled so that the ethylene content of the first and second polymers differs by 3–75 wt %, more preferably 5–60 wt %, most preferably 7–50% wt %.

Making a Semi-crystalline/Amorphous Blend

Monomer proportions may also be controlled to yield a blend where one component is semi-crystalline while the other is amorphous. Thus, the monomer proportions in the first reactor and the second reactor may be controlled so that one of the polymers chosen from the first polymer or the second polymer contains 0 to 20 wt % ethylene, is semi crystalline due to the presence of isotactic propylene sequences, and has a melting point of 40–160° C. while the other polymer is amorphous. Furthermore, the monomer proportions in the first reactor and the second reactor may be controlled so that one of the polymers chosen from the first polymer or the second polymer contains 60 to 85 wt % ethylene, is semi-crystalline due to the presence of long ethylene sequences, and has a melting point of 40–120° C. while the other polymer is amorphous. Blends of two semi-crystalline polymers, one with 0–20% ethylene and the other with 60–85% ethylene are also within the scope of this invention. The level of crystallinity and the composition difference between the components may also selected such that the blend components are immiscible and the final product consists of a two phase mixture. It is particularly desirable to have one of the components of the two phase mixture contain crystallinity due to the presence of isotactic propylene sequences. Such two phase blends cannot be produced by the prior art vanadium catalyst systems.

Catalyst and Reactor Operation

Where the catalyst is concerned, it is preferable for economic reasons that substantially all of the catalyst is added to the first reactor. The catalyst components can be fed to this reactor system either separately or premixed. The catalyst (described further below) is a group 4, 5, and 6 metallocene catalyst activated by a methylalumoxane, MAO or a non-coordinating anion NCA and optionally, a scavenging compound. Preferably, the catalyst is chiral and stereorigid. Preferably the catalyst is capable of producing stereo regular polypropylene.

Where reactor temperatures are concerned, it is preferable that the first reactor operates at temperatures between about 0 to 110° C. and the second reactor operates between about 40 to 160° C. Preferably, the first reactor operates at temperatures between about 10 to 90° C. and the second reactor operates between about 50 to 140° C. Most preferably the first reactor operates at temperatures between about 20 to 70° C. and the second reactor operates between about 60 to 120° C. Preferably, reactors are cooled at least in part by feed prechilling and there is a temperature difference between the reactors.

To-protect against catalyst deactivation, a scavenger can be added to at least one of the sets of reactor feeds before their respective polymerizations. Preferably the scavenger is trialkyl aluminum.

Where the reactors are concerned, it is preferable that the first and second reactors are continuous flow stirred tank reactors in series. Additionally, it is preferable that the polymerization in the first and second reactors is homogeneous solution polymerization.

DETAILED DESCRIPTION OF THE INVENTION

The process of the present invention may be performed by any of the well known multi-stage reactor systems. Two suitable systems are disclosed in U.S. Pat. No. 4,016,342 and U.S. Pat. No. 4,306,041 which are incorporated by reference for U.S. patent practice. Additionally, copending applications Ser. No. 09/260,966 filed on Mar. 4, 1998 and Ser. No. 60/076,841 filed on Mar. 4, 1998, disclose suitable multistage reactor systems and are incorporated by reference for U.S. patent practice. If desired, more than two reactors can be used in the process of this invention. The process of the present invention is applicable to slurry or solution polymerization but solution polymerization is preferred and is exemplified herein.

Choice of reactor temperature is dependent upon the effect of temperature on catalyst deactivation rate and polymer properties, principally polymer molecular weight. Temperatures should not exceed the point at which the concentration of catalyst in the second reactor is insufficient to make the desired polymer component in the desired amount. This temperature will be a function of the details of the catalyst system. In general, the first reactor temperature can vary between 0–110° C. with 10–90° C. preferred and 20–70° C. most preferred. Second reactor temperatures will vary from 40–160° C., with 50–140° C. preferred and 60–120° C. most preferred. Reactor may be cooled by reactor jackets, cooling coils, auto refrigeration, pre-chilled feeds or combinations of these. Adiabatic reactors with pre-chilled feeds are preferred. This gives rise to a temperature difference between reactors which is helpful for controlling polymer molecular weight.

Residence time is the same or different in each reactor stage as set by reactor volumes and flow rates. Residence time is defined as the average length of time reactants spend within a process vessel. The total residence time, i.e., the total time spent in all reactors is preferably 2–80 minutes and more preferably 5–40 minutes.

Polymer composition is controlled by the amount of monomers fed to each reactor of the train. In a two reactor series, unreacted monomers from the first reactor flow into the second reactor and so the monomers added to the second reactor are just enough to adjust the composition of the feed to the desired level, taking into account the monomer carry over. Depending on reaction conditions in the first reactor (catalyst concentration, temperature, monomer feed rates, etc.) a monomer may be in excess in the reactor outlet relative to the amount required to make a certain composition in the second reactor. Since it is not economically feasible to remove a monomer from the reaction mixture, situations like this should be avoided by adjusting reaction conditions. The amount of polymer made in each reactor depends on numerous reactor operating conditions such as residence time, temperature, catalyst concentration and monomer concentration, but depends most strongly on monomer concentration. Thus, the amount and composition of the polymer made in the second reactor are interdependent to some degree.

Polymer molecular weight is controlled by reactor temperature, monomer concentration, and by the addition of chain transfer agents such as hydrogen. With metallocene catalysts, polymer molecular weight usually declines as reaction temperature increases and as the ethylene content of the polymer decreases. Adiabatic reactor operation in a two reactor series produces a higher temperature in the second reactor than the first thereby facilitating production of the low molecular weight component in the second reactor. Molecular weight in the second reactor can be further reduced and MWD broadened by adding hydrogen to the second reactor. Hydrogen can also be added to the first reactor but because unreacted hydrogen will carry over to the second reactor the molecular weight of both polymer components will be decreased in this situation and the effect of hydrogen on MWD will be much less. High monomer concentration generally increases polymer molecular weight.

Polymer composition may affect polymer molecular weight, other things being equal, due to chain transfer processes involving the alpha-olefin comonomer. In general, it is often observed that molecular weight decreases as the alpha-olefin content of the polymer is raised. In the context of molecular weight control, the alpha-olefin comonomer may be viewed as a chain transfer agent and may be used to affect the molecular weight of one of the blend components.

In a two reactors in series, diene can be added to either or both reactors. Diene is added only to the second reactor to produce a copolymer/terpolymer blend.

The polymer product can be recovered from solution at the completion of the polymerization by any of the techniques well known in the art such as steam stripping followed by extrusion drying or by devolatilizing extrusion.

Higher Alpha-olefins

Although the most preferred higher alpha-olefin is propylene for use with this invention, other higher alpha-olefins may be used as set forth below. Higher alpha-olefins suitable for use may be branched or straight chained, cyclic, and aromatic substituted or unsubstituted, and are preferably $C_3$–$C_{18}$ alpha-olefins. Illustrative non-limiting examples of preferred higher alpha-olefins are propylene, 1-butene, 1-pentene, 1-hexene, 1-octene, and 1-dodecene. Mixed alpha-olefins can be used as well as mixed alpha- and non-alpha-olefins (e.g., mixed butenes) as long as any non-polymerizable olefins in the mixture act as inerts towards the catalyst. Illustrative of such substituted higher alpha-olefins are compounds of the formula $H_2C=CH-C_nH_{2n}-X$ wherein n is an integer from 1 to 30 carbon atoms (preferably to 10 carbon atoms), and X preferably comprises $CH_3$ but can comprise aryl, alkaryl, or cycloalkyl substitutents. Also useful are higher alpha-olefins substituted by one or more such X substituents wherein the substituent(s) are attached to a non-terminal carbon atom, more preferably being attached to a non-terminal carbon atom which is preferably 2 to 30 carbons removed from the terminal carbon atom, with the proviso that the carbon atom so substituted is preferably not in the 1- or 2-carbon position in the olefin. The higher alpha-olefins, when substituted, are preferably not substituted with aromatics or other bulky groups on the 2-carbon position since aromatic and bulky groups interfere with the subsequent desired polymerization.

Diene

Although ENB is the most preferred non-conjugated diene to be used in the invention, other non-conjugated dienes are useful as set forth below. Non-conjugated dienes useful as co-monomers preferably are straight chain, hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene;

methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo (Δ-11,12) 5,8 dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this application the terms "non-conjugated diene" and "diene" are used interchangeably.

Solvent

Although hexane is the most preferred solvent to be used in the invention, other solvents which may be used are hydrocarbons such as aliphatics, cycloalphatics, and aromatic hydrocarbons with the proviso that the solvent is inert towards the catalyst. Preferred solvents are C12 or lower straight-chain or branched-chain, saturated hydrocarbons, and C5 to C9 saturated alicyclic or aromatic hydrocarbons. Examples of such solvents or reaction media are hexane, butane, pentane, heptane, cyclopentane, cyclohexane, cycloheptane, methyl cyclopentane, methyl cyclohexane, isooctane, benzene, toluene, and xylene. In addition, one or more -olefins, either alone or admixed with other media, may serve as the reaction media, at selected concentrations of such olefins.

Metallocene Catalyst Precursors

The term "metallocene" and "metallocene catalyst precursor" as used herein shall be understood to refer to compounds possessing a transition metal M, with cyclopentadienyl (Cp) ligands, at least one non-cyclopentadienyl-derived ligand X, and zero or one heteroatom-containing ligand Y, the ligands being coordinated to M and corresponding in number to the valence thereof The metallocene catalyst precursors are generally neutral complexes but when activated with a suitable co-catalyst yield an active metallocene catalyst which refers generally to an organometallic complex with a vacant coordination site that can coordinate, insert, and polymerize olefins. The metallocene catalyst precursors is preferably one of, or a mixture of metallocene compounds of either or both of the following types:

1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula

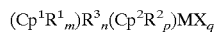

wherein $Cp^1$ of ligand $(Cp^1R^1_m)$ and $Cp^2$ of ligand $(Cp^2R^2_p)$ are the same or different cyclopentadienyl rings $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0 to 5, p is 0 to 5, and two $R^1$ and/or $R^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0 to 8, preferably 0 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from group VA or VIA of the periodic table of the elements. These mono-cyclopentadienyl complexes have the general formula

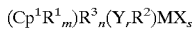

wherein $R^1$ is, each independently, a halogen or a hydrocarbyl, halocarbyl, hydrocarbyl-substituted organometalloid or halocarbyl-substituted organometalloid group containing up to about 20 carbon atoms, "im" is 0 to 5, and two $R^1$ substituents on adjacent carbon atoms of the cyclopentadienyl ring associated there with can be joined together to form a ring containing from 4 to about 20 carbon atoms, $R^3$ is a bridging group, "n" is 0 to 3, M is a transition metal having a valence of from 3 to 6, preferably from group 4, 5, or 6 of the periodic table of the elements and is preferably in its highest oxidation state, Y is a heteroatom containing group in which the heteroatom is an element with a coordination number of three from Group VA or a coordination number of two from group VIA preferably nitrogen, phosphorous, oxygen, or sulfur, $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of suitable biscyclopentadienyl metallocenes of the type described in group 1 above for the invention are disclosed in U.S. Pat. Nos. 5,324,800; 5,198,401; 5,278,119;

5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting, examples of preferred bis-cyclopentadienyl metallocenes of the type described in group 1 above for the invention are the racemic isomers of:

μ-$(CH_3)_2$Si(indenyl)$_2$M(Cl)$_2$
μ-$(CH_3)_2$Si(indenyl)$_2$M(CH$_3$)$_2$
μ-$(CH_3)_2$Si(tetrahydroindenyl)$_2$M(Cl)$_2$
μ-$(CH_3)_2$Si(tetrahydroindenyl)$_2$M(CH$_3$)$_2$
μ-$(CH_3)_2$Si(indenyl)$_2$M(CH$_2$CH$_3$)$_2$
μ-$(C_6H_5)_2$C(indenyl)$_2$M(CH$_3$)$_2$;

wherein M is chosen from a group consisting of Zr and Hf.

Examples of suitable unsymmetrical cyclopentadienyl metallocenes of the type described in group 1 above for the invention are disclosed in U.S. Pat. Nos. 4,892,851; 5,334,677; 5,416,228; and 5,449,651; and are described in publication *J. Am. Chem. Soc.* 1988, 110, 6255, all of which are incorporated by reference herein.

Illustrative, but not limiting, examples of preferred unsymmetrical cyclopentadienyl metallocenes of the type described in group 1 above for the invention are:

μ-$(C_6H_5)_2$C(cyclopentadienyl)(fluorenyl)M(R)$_2$
μ-$(C_6H_5)_2$C(3-methylcyclopentadienyl)(fluorenyl)M(R)$_2$
μ-$(CH_3)_2$C(cyclopentadienyl)(fluorenyl)M(R)$_2$
μ-$(C_6H_5)_2$C(cyclopentadienyl)(2-methylindenyl)M(CH$_3$)$_2$
μ-$(C_6H_5)_2$C(3-methylcyclopentadienyl)(2-methylindenyl)M(Cl)$_2$
μ-$(C_6H_5)_2$C(cyclopentadienyl)(2,7-dimethylfluorenyl)M(R)$_2$
μ-$(CH_3)_2$C(cyclopentadienyl)(2,7-dimethylfluorenyl)M(R)$_2$;

wherein M is chosen form a group consisting of Zr and Hf and R is chosen from a group consisting of Cl and CH$_3$.

Examples of suitable monocyclopentadienyl metallocenes of the type described in group 2 above for the invention are disclosed in U.S. Pat. Nos. 5,026,798; 5,057,475; 5,350,723; 5,264,405; 5,055,438 and are described in publication WO 96/002244, all of which are incorporated by reference herein.

Illustrative, but not limiting, examples of preferred monocyclopentadienyl metallocenes of the type described in group 2 above for the invention are μ-$(CH_3)_2$Si(cyclopentadienyl)(1-adamantylamido)M(R)$_2$
μ-$(CH_3)_2$Si(3-tertbutylcyclopentadienyl)(1-adamantylamido)M(R)$_2$
μ-$(CH_2)$(tetramethylcyclopentadienyl)(1-adamantylamido)M(R)$_2$
μ-$(CH_3)_2$Si(tetramethylcyclopentadienyl)(1-adamantylamido)M(R)$_2$
μ-$(CH_3)_2$C(tetramethylcyclopentadienyl)(1-adamantylamido)M(R)$_2$
μ-$(CH_3)_2$Si(tetramethylcyclopentadienyl)(1-tertbutylamido)M(R)$_2$
μ-$(CH_3)_2$Si(fluorenyl)(1-tertbutylamido)M(R)$_2$
μ-$(CH_3)_2$Si(tetramethylcyclopentadienyl)(1-cyclododecylamido)M(R)$_2$
μ-$(C_6H_5)_2$C(tetramethylcyclopentadienyl)(1-cyclododecylamido)M(R)$_2$;

wherein M is selected from a group consisting of Ti, Zr, and Hf and wherein R is selected from Cl and CH$_3$.

Another class of organometallic complexes that are useful catalysts for the process describe herein are those with diimido ligand systems such as those described in WO 96/23010 assigned to Du Pont. These catalytic polymerization compounds are incorporated here by reference.

Noncoordinating Anions

The term "noncoordinating anion" (NCA) means an anion which either does not coordinate to said transition metal cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

Descriptions of ionic catalysts for coordination polymerization comprised of metallocene cations activated by non-coordinating anions appear in the early work in EP-A-0 277 003, EP-A-0 277 004, U.S. Pat. Nos. 5,198,401 and 5,278,119, and WO92/00333. These teach a preferred method of preparation wherein metallocenes (bisCp and monoCp) are protonated by an anionic precursors such that an alkyl/hydride group is abstracted from a transition metal to make it both cationic and charge-balanced by the non-coordinating anion. The use of ionizing ionic compounds not containing an active proton but capable of producing both the active metallocene cation and a noncoordinating anion is also known. See, EP-A-0 426 637, EP-A- 0 573 403 and U.S. Pat. No. 5,387,568. Reactive cations other than Bronsted acids capable of ionizing the metallocene compounds include ferrocenium triphenylcarbonium and triethylsilylinium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like. The description of non-coordinating anions and precursors thereto of these documents are incorporated by reference for purposes of U.S. patent practice.

An additional method of making the ionic catalysts uses ionizing anionic pre-cursors which are initially neutral Lewis acids but form the cation and anion upon ionizing reaction with the metallocene compounds, for example tris(pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375. The description of non-coordinating anions and precursors thereto of these documents are similarly incorporated by reference for purposes of U.S. patent practice.

Examples of suitable activators capable of ionic cationization of the metallocene compounds of the invention, and consequent stabilization with a resulting noncoordinating anion include:

trialkyl-substituted ammonium salts such as;
triethylammonium tetraphenylborate,
tripropylammonium tetraphenylborate,
tri(n-butyl)ammonium tetraphenylborate,
trimethylammonium tetrakis(p-tolyl)borate,
trimethylammonium tetrakis(o-tolyl)borate,
tributylammonium tetrakis(pentafluorophenyl)borate,
tripropylammonium tetrakis(o,p-dimethylphenyl) borate,
tributylammonium tetrakis(m,m-dimethylphenyl) borate,
tributylammonium tetrakis(p-trifluoromethylphenyl) borate,
tributylammonium tetrakis(pentafluorophenyl)borate,
tri(n-butyl)ammonium tetrakis(o-tolyl)borate and the like;

N,N-dialkyl anilinium salts such as:
N,N-dimethylanilinium tetrakis(pentafluorophenyl) borate,
N,N-dimethylaniliniumtetrakis(heptafluoronaphthyl) borate,
N,N-dimethylanilinium tetrakish(perfluoro-4-biphenyl)borate,
N,N-dimethylanilinium tetraphenylborate,
N,N-diethylanilinium tetraphenylborate,
N,N-2,4,6-pentamethylanilinium tetraphenylborate and the like;

dialkyl ammonium salts such as:
di-(isopropyl)ammonium tetrakis(pentafluorophenyl) borate,
dicyclohexylammonium tetraphenylborate and the like;

and triaryl phosphonium salts such as;
triphenylphosphonium tetraphenylborate,
tri(methylphenyl)phosphonium tetraphenylborate,
tri(dimethylphenyl)phosphonium tetraphenylborate and the like.

Further examples of suitable anionic precursors include those comprising a stable carbonium ion, and a compatible non-coordinating anion. These include:

tropillium tetrakis(pentafluorophenyl)borate,
triphenylmethylium tetrakis(pentafluorophenyl)borate,
benzene (diazonium) tetrakis(pentafluorophenyl)borate,
tropillium phenyltris(pentafluorophenyl)borate,
triphenylmethylium phenyl-(trispentafluorophenyl) borate,
benzene (diazonium) phenyl-tris(pentafluorophenyl) borate,
tropillium tetrakis(2,3,5,6-tetrafluorophenyl)borate,
triphenylmethylium tetrakis(2,3,5,6-tetrafluorophenyl) borate,
benzene (diazonium) tetrakis(3,4,5-trifluorophenyl) borate,
tropillium tetrakis(3,4,5-trifluorophenyl)borate,
benzene (diazonium) tetrakis(3,4,5-trifluorophenyl) borate,
tropillium tetrakis(3,4,5-trifluorophenyl)aluminate,
triphenylmethylium tetrakis(3,4,5-trifluorophenyl) aluminate,
benzene (diazonium) tetrakis(3,4,5-trifluorophenyl) aluminate,
tropillium tetrakis(1,2,2-trifluoroethenyl)borate,
triphenylmethylium tetrakis(1,2,2-trifluoroethenyl) borate,
benzene (diazonium) tetrakis(1,2,2-trifluoroethenyl) borate,
tropillium tetrakis(2,3,4,5-tetrafluorophenyl)borate,
triphenylmethylium tetrakis(2,3,4,5-tetrafluorophenyl) borate,
benzene (diazonium) tetrakis(2,3,4,5-tetrafluorophenyl) borate, and the like.

Where the metal ligands include halide moieties for example, (methyl-phenyl) silylene(tetra-methyl-cyclopentadienyl)(tert-butyl-amido) zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger its use in excess of that normally stoichiometrically required for akylation of the metallocene will permit its addition to the reaction solvent with the metallocene compound. Normally alumoxane would not be added with the metallocene so as to avoid premature activation, but can be added directly to the reaction vessel in the presence of the polymerizable monomers when serving as both scavenger and alkylating activator.

Known alkylalumoxanes are additionally suitable as catalyst activators, particularly for those metallocenes comprising halide ligands. The alumoxane component useful as catalyst activator typically is an oligomeric aluminum compound represented by the general formula $(R—Al—O)_n$, which is a cyclic compound, or $R(R—Al—O)_nAlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4, i.e. methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Although trialkyl aluminum is the most preferred scavenger to be used in the invention, other scavengers may be used as set forth below. The term "scavenging compounds" as used in this application and in the claims is meant to include those compounds effective for removing polar impurities from the reaction solvent. Such impurities can be inadvertently introduced with any of the polymerization reaction components, particularly with solvent, monomer and comonomer feed, and adversely affect catalyst activity and stability. It can result in decreasing or even elimination of catalytic activity, particularly when a metallocene cation-noncoordinating anion pair is the catalyst system. The polar impurities, or catalyst poisons include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically the scavenging compound will be 5 an organometallic compound such as the Group-13 organometallic compounds of 5,153,157, 5,241,025, EP-A-638 and WO-A-91/09882 and WO-A-94/03506, noted above, and that of WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-noncoordinating anion pairs is minimized during polymerization reactions to that amount effective to enhance activity.

The metallocene catalyst component and the activator may be fed to the reactor either separately or premixed.

The catalyst systems especially desirable for EP polymerization give a combination of high activity, good incorporation of the alpha-olefin and diene into the chain, and polymer molecular weights high enough for elastomer applications at economically attractive reactor temperatures. Catalyst systems particularly preferred for achieving these objectives include catalysts selected the grom consisting of $\mu$-$(CH_3)_2Si(Indenyl)_2Hf(CH_3)_2$, $\mu$-$(CH_3)_2Si$[tetramethylcyclopentadienyl] [adamantylamido] $Ti(CH_3)_2$, or $\mu$-$(C_6H_5)_2Si$[cyclopentadienyl][flourenyl]$Hf(CH_3)_2$.

Although trialkyl aluminum is the most preferred scavenger to be used in the invention, other scavengers may be used as set forth below. The term "scavenging compounds" as used in this application and in the claims is meant to include those compounds effective for removing polar impurities from the reactor feed mixture. Such impurities can be inadvertently introduced with any of the polymerization reaction components, particularly with solvent and monomer, and adversely affect catalyst activity and stability. It can result in decreasing or even elimination of catalytic activity, particularly when a metallocene cation-noncoordinating anion pair is the catalyst system. The polar impurities, or catalyst poisons include water, oxygen, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically the scavenging compound will be an organometallic compound such as the Group-13 organometallic compounds of 5,153,157, 5,241,025, EP-A- 638 and WO-A-91/09882 and WO-A-94/03506, noted above, and that of WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst. When an alumoxane is used as activator, additional scavenging compounds are not necessary. The amount of scavenging agent to be used with metallocene cation-noncoordinating anion pairs is minimized during polymerization reactions to that amount effective to enhance activity.

Dynamic Vulcanization

The amorphous components of the series reactor blend are generally present as small, i.e., micro-size particles within a continuous semicrystalline plastic matrix, although a co-continuous morphology or a phase inversion is also possible depending upon the amount of amorphous relative to semicrystalline plastic. The amorphous component is desirably at least partially crosslinked, and preferably is completely or fully crosslinked. It is preferred that the amorphous component be crosslinked by the process of dynamic vulcanization. As used in the specification and claims, the term "dynamic vulcanization" means a vulcanization or curing process for a amorphous component blended with a semicrystalline plastic, wherein the amorphous component is vulcanized under conditions of shear at a temperature at which the mixture will flow. The amorphous component is thus simultaneously crosslinked and dispersed as fine particles within the semicrystalline plastic matrix, although as noted above, other morphologies may exist. Dynamic vulcanization is effected by mixing the components at elevated temperatures in conventional mixing equipment such as roll mills, Banbury mixers, Brabender mixers, continuous mixers, mixing extruders, and the like. The unique characteristic of dynamically cured compositions is that, notwithstanding the fact that the amorphous component is partially or fully cured, the compositions can be processed and reprocessed by conventional plastic processing techniques such as extrusion, injection molding, and compression molding. Scrap or flashing can be salvaged and reprocessed.

The terms "fully vulcanized" and "fully cured" or "fully crosslinked" as used in the specification and claims means that the amorphous component to be vulcanized has been cured or crosslinked to a state in which the elastomeric properties of the crosslinked amorphous component are similar to those of the amorphous component in its conventional vulcanized state, apart from the cured series reactor blended composition. The degree of cure can be described in terms of gel content, or conversely, extractable components. The amorphous component can be described as fully cured when less than about 5% and preferably less than 3%, of the amorphous component which is capable of being cured by hydrosilylation is extractable from the product by a solvent for that amorphous component. Alternatively, the degree of cure may be expressed in terms of crosslink density. All of these descriptions are all known in the art, for example in U.S. Pat. Nos. 5,100,947 and 5,157,081, both of which are fully incorporated herein by reference for U.S. Patent practice.

The compositions can be processed and reprocessed by conventional plastic processing techniques such as extrusion, injection molding, and compression molding. Those of ordinary skill in the art will appreciate the appropriate quantities, types of cure systems, and vulcanization conditions required to carry out the vulcanization of the amorphous component. The amorphous component can be vulcanized using varying amounts of curative, varying temperature, and varying time of cure in order to obtain the optimum crosslinking desired. Any known cure system for the amorphous component can be used, so long as it is suitable under the vulcanization conditions with the specific olefinic amorphous component or combination of amorphous components being used with the polyolefin. These curatives include sulfur, sulfur donors, metal oxides, resin systems, peroxide-based systems, hydrosilation with platinum or peroxide and the like, both with and without accelerators and coagents.

EXAMPLES

Polymerizations were carried out in two, one liter stirred reactors in series with continuous flow of feeds to the system and continuous withdrawal of products. The first reactor could also be operated as a single reactor. Solvent (hexane) and monomers (ethylene, propylene, and ENB) were purified over beds of alumina and mole sieves. Toluene for preparing catalyst solutions was also purified by the same technique. All feeds were pumped into the reactors by metering pumps except for the ethylene which flowed as a gas under its own pressure through a mass flow controller. Reactor temperature was controlled by circulating water through a reactor cooling jacket. The reactors were maintained at a pressure in excess of the vapor pressure of the reactant mixture to keep the reactants in the liquid phase. The reactors were operated liquid full.

Ethylene and propylene feeds were combined into one stream and then mixed with a prechilled hexane stream that had been cooled to at least 0° C. If ENB was used, it was also fed into the hexane stream upstream of the other monomers. A hexane solution of triisobutyl aluminum scavenger was added to the combined solvent and monomer stream just before it entered the reactor to further reduce the concentration of any catalyst poisons. The TIBA/metallocene molar ratio was typically 10–60. A mixture of the catalyst components in toluene was pumped separately to the reactor and entered through a second port. The polymer solution exiting the first reactor entered the second reactor. A hexane solution of the monomers was fed into the second reactor through a separate port. The product from the second reactor exited through a pressure control valve that reduced the pressure to atmospheric. This caused the excess monomers in the solution to flash into a vapor phase which was vented from the top of a vapor liquid separator. The liquid phase flowed out the bottom of the separator and was collected for polymer recovery. Polymer was recovered from solution by either steam stripping following by drying or by solvent evaporation under heat and vacuum.

The polymer from the first and second reactors was characterized to give Mooney viscosity (by Mooney Viscometer, ASTM D1648), ethylene content (by FTIR, ASTM D3900), ENB content (by FTIR, ASTM D6047), melt temperature and/or glass transition temperature (by $DSC_1$ described herein), and molecular weight (by $GPC_1$ described herein). Analysis of the second reactor polymer represents the properties of the overall polymer blend.

Gel Permeation Chromatography (GPC) techniques that were used to characterize the products of this invention have been described in several publications, notably U.S. Pat. No. 4,989,436, which is incorporated for purposes of U.S. patent practice. Molecular weight and composition measurements are described in G. Ver Strate, C. Cozewith, S. Ju, *Macromolecules*, 21, 3360 (1988) which is incorporated by reference for purposes of U.S. patent practice. Differential scanning calorimetry (DSC) was used to characterize the products of this invention has a standard protocol of loading a calorimeter at 20° C. with a specimen free of molding strains, annealing at room temperature for 40 hours, cooling the sample to −75° C., scanning to 180° C. at 10° C./min., cooling to −75° C., and re-running the scan. The $T_g$, $T_m$, and heat of fusion are evaluated. In some cases, low melting crystallinity will not be seen on the second scan as it may take many hours to develop even at low temperatures.

Atomic force microscopy (AFM) was used to determine the number of polymer phases present in the final product after recovery from the reactor solution. The AFM analyses were performed using a Digital Instruments Dimension 3000 instrument operated under ambient conditions. The instrument was operated in the tapping mode mapping height, amplitude and phase-shift. The height analysis yields the overall topography of the specimen. The amplitude analysis provides differential height images, which are sensitive to height changes but not to the absolute height. The phase-shift images, provide modulus/chemical maps of the surface. Bar Si cantilevers (225 $\mu$m long and 30 $\mu$m wide) with force constants between 0.4 and 5 N/m were used for these analyses. While tapping in air, the cantilever was oscillated at a frequency slightly less than its resonance frequency with an RMS amplitude between 3.5 and 4.0 volts (as measured on the position sensitive detector). During specimen analysis, the RMS amplitude setpoint was adjusted to approximately 30% of the RMS amplitude of cantilever oscillating in air. Prior to analysis, the elastomer specimens were cryogenically faced at −150° C. using an ultramicrotome. Specimens were allowed to warm up to room temperature in a nitrogen filled dissector, and then analyzed at room temperature.

Samples of the polymer solution from the first and second reactors were analyzed for polymer concentration. From this measurement and the reactor feed rates, the polymerization rates in both reactors could be determined by material balances. Monomer conversions were then calculated from the polymerization rate and polymer composition data for the first reactor alone and for the total of both reactors together. In order to calculate the polymerization rate and polymer composition in the second reactor alone, the following material balance equations were used:

| | |
|---|---|
| PR2=PRt−PR1 | Eq. 1 |
| F1=PR1/PRt | Eq. 2 |
| E2={Et−(F1×E1)}/(1−F1) | Eq. 3 |
| D2={Dt−(F1×D1)}/(1−F1) | Eq. 4 |
| MN2=(1−F1)/(1/MNt−F1/MN1) | Eq. 5 |
| MW2=(MWt−F1*MW1)/(1−F1) | Eq. 6 | where:
PR1=1st reactor polymerization rate
PR2=2nd reactor polymerization rate
PRt=Total polymerization rate
E1=Ethylene content of 1st reactor polymer
E2=Ethylene content of 2nd reactor polymer
Et=Ethylene content of total reactor polymer
D1=Diene content of 1st reactor polymer
D2=Diene content of 2nd reactor polymer
Dt=Diene content of total reactor polymer
F1=Fraction of total polymer made in first reactor
MN1=Number average MW of 1st reactor polymer
MN2=Number average MW of 2nd reactor polymer
MNt=Number average MW of total reactor polymer
MW1=Weight average MW of 1st reactor polymer
MW2=Weight average MW of 2nd reactor polymer
MWt=Weight average MW of total reactor polymer.

A series of polymerizations was carried out to demonstrate the process and products of this invention. All of the reactor conditions, polymer shown for reactor 1 (R-1) and the total product are based on actual measurements for the reactor 1 polymer and the polymer mixture exiting reactor 2. The results for reactor 2 (R-2) alone were calculated from these data by means of the formulas given above.

Example 1 (121C)

A series reactor polymerization was carried out with dimethylsilybisindenyl hafnium dichloride (cat A) catalyst mixed with N,N-dimethylanilinium tretakis(penta fluorophenyl) boron (DMPFB) as activator. The catalyst components were dissolved in toluene in a 1/1 molar ratio. Reactor conditions and feed rate are shown in Table 1. The catalyst feed rate shown is the feed of cat A only and catalyst efficiency is calculated by dividing the polymerization rate by the cat A feed rate. A mixture of ethylene and propylene was fed to the first reactor but only ethylene was fed to the second reactor. The polymer produced in the first reactor had an ethylene content of 15.5% and the second reactor polymer had an ethylene content of 55%. The molecular weight of the polymer produced in each reactor was similar so the product blend was not broadened in MWD. The reactor 1 polymer was semi crystalline due to propylene crystallinity but the polymer made in reactor 2 was amorphous.

Example 2 (125A)

A polymerization was carried out with cat A at similar conditions to example 1 except that diene (ENB) was fed to the second reactor to produce a terpolymer. The first reactor polymer was a semicrystalline copolymer with 17 wt % ethylene that melted over the range from 29.6 to 99° C. The second reactor polymer was an amorphous terpolymer with 50.6 wt % ethylene and 3.29 wt % ENB. Reactor conditions and polymerization results are shown in Table I.

Example 3 (127A,B,C)

A series of polymerizations were carried out with cat A at similar conditions to those used in example 1 except increasing amounts of ethylene were fed to the second reactor in runs A to C. Reactor conditions and polymerization results are shown in Table I. As a result of raising the ethylene feed to the second reactor, the fraction of total polymer made in the first reactor decreased from 36% to 20% and the ethylene content of the second reactor polymer increased from 47.4 to 61 wt %. Thus, by adjusting the second reactor feed rates the composition and amount of the second component in the blend can easily be varied. The same amount of control is not possible when prior art vanadium catalysts are used because of the low active catalyst concentration in the second reactor.

Example 4 (131 C)

A polymerization was carried out with the same catalyst and procedure as used in example 1 to produce a terpolymer blend. Reactor conditions and polymerization results are shown in Table I. In this polymerization, ENB was fed to both reactors in addition to the other monomers. The polymer produced in the first reactor had 18.8 wt % ethylene and 3.25 wt % ENB while the polymer produced in the second reactor had 47.8 wt % ethylene and 8.53 wt % ENB.

Example 5 (173A)

A polymerization was carried out with the same catalyst and procedure as used in example 4 to produce a terpolymer blend. However, reactor temperatures are higher than in the previous examples, and the 2nd reactor is at 65° C. as compared to 40° C. Reactor conditions and polymerization results are shown in Table I. In this example, the polymers produced in each reactor were amorphous, and the polymer produced in the first reactor had 30.3 wt % ethylene while the polymer produced in the second reactor had 53.1 wt % ethylene. The MWD of the final product was broadened due to different MW polymer being produced in each reactor. The Mw/Mn was 2.84.

Example 6 (272A)

A polymerization was carried out by the procedure used in example 1 except the catalyst was dimethylsilyltrtracyclopentadienylada/mantylamido titanium dichloride (cat B). As in example 1, it was fed to the reactor in a 1/1 molar ratio with DMPFB dissolved in toluene. Copolymerization was carried out at reactor temperatures of 30° C. and 75° C. Reactor conditions and polymerization results are shown in Table I. Hydrogen was added to the first reactor to reduce polymer molecular weight. An amorphous copolymer with 32.9 wt % ethylene was made in the first reactor while a semicrystalline copolymer with 79.5 wt % ethylene was made in the second reactor. 64 wt % of the product was made in the first reactor. The MWD of the final product was narrow with Mw/Mn equal to 1.94.

Example 7 (293 A, B, C, D)

A series of polymerizations was carried out with cat B using the procedure of example 6 to prepare copolymer and terpolymer blends with broadened MWD. In this example, the reactor system was allowed to reach steady state in the initial conditions (run A). After a product sample was collected, diene was added to both reactors to prepare a terpolymer blend and the reactor was again allowed to reach steady state before obtaining a second sample (run B). This procedure was continued for runs C and D. Reactor conditions and polymerization results are shown in Table I. In runs A and B the high ethylene content blend component was made in the second reactor. In runs C and D the compositions were reversed and the high ethylene content component was made in the first reactor. Also, hydrogen was added to the first reactor as a chain transfer agent to produce a low molecular weight product in runs C and D. The polymers made in runs A, B, and C had broad MWD as indicated by Mw/Mn values of 4.5 to 9.8.

Example 8 (319 B, C)

This run was made with cat B using the procedure of example 1 to demonstrate the benefits of series reactor operation with monomer feed to both reactors. In run B, series reactors were used but with no additional monomer feed to the second reactor. Reactor conditions and polymerization results are shown in Table I. Polymerization rate was low in the second reactor due to the low monomer concentration and the polymer composition was about the same for the polymer made in both reactors. In run C, reactor conditions were kept the same, except monomers were now added to the second reactor. As compared to the initial run B, polymerization rate and catalyst efficiency improved and a polymer blend was produced with one component containing 76.2 wt % ethylene and the other containing 39.3 wt % ethylene.

Example 9 (268B, 272A, 307C, 318A, 320C, 293A)

A series of polymerizations were carried out using the procedure in Example 1 to make polymer blends in which the two components are immiscible to a large degree and the final product, after recovery from solution, was a two-phase mixture. Reactor conditions and polymerization results are shown in Table II. The products produced in runs 268A and 293A are blends of two essentially amorphous polymers made with catalysts A and B. The products made in runs 272A and 320C are blends of an amorphous component and a component that has high ethylene content and contains ethylene crystallinity. The polymers in runs 307C and 318C were made with catalyst A and contain a component with propylene crystallinity and a component with higher ethylene content that does not contain propylene crystallinity.

All of the polymers were analyzed by atomic force microscopy (AFM) to determine the number of phases present. As shown by the result for polymer 318C in Example 1, the polymer product consisted of a two phase mixture. All of the other products in this example gave similar results.

Example 10

A series of reactor blends is dynamically vulcanized in a Brabender mixer by mixing the blends until the plastic phase melts and the torque has leveled off At that time, the cure system is added and mixing is continued for 4 minutes. The material is mixed at 180° C. and 100 RPM and the temperature rises during cure to about 200° C. The products are then removed from the Brabender and compression molded and evaluated for physical properties.

Table 3 shows the remitting properties and the compositions.

TABLE 1

REACTOR OPERATING CONDITIONS

| Run | Reactor | poly rate g/hr | C2= in poly wt % | diene in poly wt % | ML (1+4) 125° | cat | temp °C | Res. Time min | H2 mol/hr | C2= | C3= | Diene | Cat. | C2= conv | C3= conv | Diene conv | cat eff g/g | Mn ×10⁻³ | Mw ×10⁻³ | Mw/Mn | Heat of Fusion J/g | DSC Melt. range °C |
|---|---|---|---|---|---|---|---|---|---|---|---|---|---|---|---|---|---|---|---|---|---|---|
| Example 1 | | | | | | | | | | | | | | | | | | | | | | |
| 121C | R-1 | 76.9 | 15.5 | 0 | | A | 20 | | | 11.4 | 240 | 0 | 0.0044 | 105 | 27.1 | 0 | 17477 | 148 | 286 | 1.93 | | |
|  | R-2 | 170.7 | 54.9 | 0 | | | 40 | | | 120 | 0 | 0 | | 78.5 | 53.6 | 0 | 38805 | 107 | 198 | 1.85 | | |
|  | Total | 247.6 | 42.7 | 0 | 54.9 | | | | | 131 | 240 | 0 | | 80.5 | 59.1 | 0 | 56283 | 117 | 225 | 1.92 | 8.3 | 41.7–71.0 |
| Example 2 | | | | | | | | | | | | | | | | | | | | | | |
| 125A | R-1 | 72 | 17 | 0 | | A | 20 | | | 9.6 | 240 | 0 | 0.0044 | 127.6 | 24.9 | 0 | 16335 | | | | | |
|  | R-2 | 86.1 | 50.6 | 3.29 | | | 40 | | | 120 | 0 | 9.98 | | 35.9 | 23.4 | 28.4 | 19526 | | | | | |
|  | Total | 158.1 | 35.3 | 1.79 | 67.4 | | | | | 130 | 240 | 9.98 | | 42.3 | 41.9 | 28.4 | 35861 | | | | 22.6 | 29.6–99 |
| Example 3 | | | | | | | | | | | | | | | | | | | | | | |
| 127A | R-1 | 76.2 | 16.1 | 0 | | A | 20 | | | 10.2 | 242 | 0 | 0.0044 | 120.3 | 26.4 | 0 | 17209 | | | | | |
|  | R-2 | 134.5 | 47.8 | 0 | | | 40 | | | 90 | 0 | 0 | | 72.5 | 35.8 | 0 | 30353 | 104 | 237 | 2.28 | 12.9 | 33–100 |
|  | Total | 210.7 | 36.1 | 0 | 39.2 | | | | | 100 | 242 | 0 | | 75.9 | 55.6 | 0 | 47562 | | | | | |
| 127B | R-1 | 78 | 17.6 | 0 | | A | 20 | | | 10.2 | 242 | 0 | 0.0044 | 134.6 | 26.6 | 0 | 17609 | | | | | |
|  | R-2 | 185.2 | 60 | 0 | | | 40 | | | 150 | 0 | 0 | | 75.8 | 62.5 | 0 | 41799 | | | | | |
|  | Total | 263.2 | 47.4 | 0 | 69.7 | | | | | 160 | 242 | 0 | | 77.9 | 57.2 | 0 | 59408 | 89.4 | 227.3 | 2.54 | 10.97 | 29.4–97.6 |
| 127C | R-1 | 58.7 | 16.5 | 0 | | A | 20 | | | 10.2 | 242 | 0 | 0.0044 | 95.1 | 20.2 | 0 | 13243 | | | | | |
|  | R-2 | 241.9 | 61 | 0 | | | 53 | | | 180 | 0 | 0 | | 81.7 | 76.4 | 0 | 54612 | | | | | |
|  | Total | 300.6 | 52.3 | 0 | 75.2 | | | | | 190 | 242 | 0 | | 82.7 | 59.3 | 0 | 67855 | 87.9 | 209.2 | 2.38 | 15.5 | 27.2–102 |
| Example 4 | | | | | | | | | | | | | | | | | | | | | | |
| 131C | R-1 | 36.9 | 18.8 | 3.3 | | A | 20 | | | 25.8 | 242 | 17 | 0.0088 | 26 | 12 | 7.1 | 4173 | | | | | |
|  | R-2 | 44 | 47.8 | 8.5 | | | 40 | | | 18 | 103 | 7.2 | | 51.9 | 6.1 | 16.3 | 4980 | | | | | |
|  | Total | 80.9 | 34.6 | 6.1 | 3 | | | | | 43.8 | 345 | 24.2 | | 60 | 14.4 | 20.5 | 9153 | | | | | |
| Example 5 | | | | | | | | | | | | | | | | | | | | | | |
| 173A | R-1 | 144.8 | 30.3 | 3 | | A | 31 | | | 60 | 222 | 10.2 | 0.0088 | 70.9 | 44.1 | 42.4 | 16449 | | | | | |
|  | R-2 | 94.4 | 53.1 | 2.11 | | | 65 | | | 60 | 73.2 | 0 | | 63.3 | 24.9 | 33.9 | 10726 | | | | | |
|  | Total | 239.1 | 39.3 | 2.65 | 24.1 | | | | | 120 | 295 | 10.2 | | 76.2 | 47.9 | 61.9 | 27175 | 61.2 | 173.8 | | 2.84 | |
| Example 6 | | | | | | | | | | | | | | | | | | | | | | |
| 272 A | R-1 | 134 | 32.9 | 4.06 | | B | 30 | 10.1 | 0.01 | 55 | 154 | 20 | 0.0066 | 76.6 | 56 | 27.2 | 20453 | 46.9 | 95.1 | 2.03 | | |
|  | R-2 | 80.5 | 79.5 | 4.59 | | | 75 | 7.23 | | 100 | 32.4 | 7.02 | | 54 | 61 | 17.1 | 12287 | 75.8 | 124.0 | 1.64 | | |
|  | Total | 214.4 | 50.4 | 4.26 | 10.3 | | | 17.4 | | 155 | 186 | 27 | | 66.6 | 54.6 | 33.8 | 32740 | 54.7 | 106 | 1.94 | 0.89 J/g | 39 °C |
| Example 7 | | | | | | | | | | | | | | | | | | | | | | |
| 293 A | R-1 | 126.3 | 31 | | | B | 30 | 10.2 | 0 | 60 | 165 | 0 | 0.005 | 65.2 | 52.8 | 0 | 25105 | 235 | 562 | 2.39 | | |

TABLE 1-continued

REACTOR OPERATING CONDITIONS

| Run | Reactor | poly rate g/hr | C2= in poly wt % | diene in poly wt % | ML (1+4) 125° | cat | temp °C | Res. Time min | H2 mol/hr | Reactor Feed, g/hr C2= | C3= | Diene | Cat. | Monomer Conv., % C2= conv | C3= conv | Diene conv | cat eff g/g | Mn ×10⁻³ | Mw ×10⁻³ | Mw/Mn | Heat of Fusion J/g | DSC Melt range °C |
|---|---|---|---|---|---|---|---|---|---|---|---|---|---|---|---|---|---|---|---|---|---|---|
|  | R-2 | 173.4 | 64.5 | 0 |  |  | 75 | 7.35 |  | 100 | 32.4 | 0 |  | 92.6 | 102 | 0 | 34470 | 25.7 | 252 | 9.82 | 7.62 | 71.3 |
|  | Total | 299.7 | 50.4 |  | 32.7 |  |  | 17.6 |  | 160 | 197 | 0 |  | 94.4 | 75.3 | 0 | 59575 | 379 | 760 | 2.00 |  |  |
| 293B | R-1 | 55.7 | 36.8 | 1.16 |  | B | 30 | 10.1 | 0 | 60 | 165 | 10 | 0.005 | 33.8 | 21.1 | 6.5 | 11074 |  |  |  |  |  |
|  | R-2 | 205.2 | 55.8 | 0.58 |  |  | 75 | 7.17 | 0 | 100 | 32.4 | 6 |  | 81.6 | 70.1 | 6 | 40786 | 64.4 | 289 | 4.49 | 4.1 |  |
|  | Total | 260.9 | 51.8 | 0.7 | 48.6 |  |  | 17.3 |  | 160 | 197 | 20.4 |  | 83.9 | 63.2 | 8.9 | 51860 | 148 | 332 | 2.25 |  |  |
| 293C | R-1 | 168.1 | 70.8 | 0 |  | B | 50 | 10.3 | 0.01 | 108 | 78 | 0 | 0.005 | 110 | 62.9 | 0 | 33415 | 20.2 | 177 | 8.74 | 2.34 | 40 |
|  | R-2 | 115.3 | 8.85 | 0 | 8.5 |  | 75 | 7.37 |  | 30 | 130 | 0 |  | 53.7 | 6.4 | 0 | 22918 | 51.2 | 147 | 2.87 | 4.14 | 40.4 |
|  | Total | 283.4 | 45.6 |  |  |  |  | 17.7 |  | 138 | 208 | 0 |  | 93.6 | 74.1 | 0 | 56333 |  |  |  |  |  |
| 293 | R-1 | 102.1 | 68.9 | 5.06 |  | B | 50 | 10.1 | 0.01 | 108 | 78 | 20 | 0.005 | 61.8 | 38.7 | 25.8 | 20301 |  |  |  |  |  |
|  | R-2 | 78.3 | 30.6 | 5.11 | 9.5 |  | 75 | 7.17 |  | 30 | 130 | 10.2 |  | 32 | 12.8 | 16 | 15575 |  |  |  |  |  |
|  | Total | 180.5 | 52.3 | 5.08 |  |  |  | 17.3 |  | 138 | 208 | 30.2 |  | 64.9 | 39.3 | 30.3 | 35876 | 50.4 | 115 | 2.28 | 2.18 | 40.7 |

Example 8

| Run | Reactor | poly rate g/hr | C2= in poly wt % | diene in poly wt % | ML (1+4) 125° | cat | temp °C | Res. Time min | H2 mol/hr | Reactor Feed, g/hr C2= | C3= | Diene | Cat. | Monomer Conv., % C2= conv | C3= conv | Diene conv | cat eff g/g | Mn ×10⁻³ | Mw ×10⁻³ | Mw/Mn | Heat of Fusion J/g | DSC Melt range °C |
|---|---|---|---|---|---|---|---|---|---|---|---|---|---|---|---|---|---|---|---|---|---|---|
| 319B | R-1 | 89.4 | 75.3 | 4.34 |  | B | 62 | 10.2 | 0 | 108 | 75 | 16.5 | 0.0064 | 59.6 | 28.2 | 23.5 | 13925 |  |  |  |  |  |
|  | R-2 | 28.1 | 74.8 | 5.55 |  |  | 90 | 7.52 |  | 0 | 0 | 0 |  | 45.5 | 36.9 | 12.4 | 4373 |  |  |  |  |  |
|  | Total | 117.5 | 75.2 | 4.63 | 124 |  |  | 17.7 |  | 108 | 75 | 16.5 |  | 78 | 37 | 33 | 18299 |  |  |  |  |  |
| 319C | R-1 | 89 | 76.2 | 4.35 |  | B | 62 | 10.2 | 0 | 108 | 75 | 16.5 | 0.0064 | 60.1 | 27 | 23.5 | 13865 |  |  |  |  |  |
|  | R-2 | 87.6 | 39.3 | 2.7 |  |  | 90 | 7.17 |  | 15 | 240 | 0 |  | 57.7 | 11.4 | 18.7 | 13653 |  |  |  |  |  |
|  | Total | 176.7 | 57.9 | 3.53 | 15 |  |  | 17.4 |  | 123 | 315 | 16.5 |  | 80.2 | 22.8 | 37.8 | 27518 |  |  |  |  |  |

TABLE 2

| Run | | Poly Rate g/hr | % C2 in EP | % Diene in EP | ML 125° C. | Cat Type | Temp ° C. | H2 Feed mol/hr | Monomer Feeds, g/hr C2= | C3= | Diene | cat feed | Monomer Conv., % C2= conv | C3= conv | Diene conv | cat eff g/g | GPC (EP) × 10⁻³ Mn dri | Mw dri | Mw/Mn dri/dri | Mw/Mn lalls/dri | Lalls Mw lalls | Mw/Mw lalls/dri |
|---|---|---|---|---|---|---|---|---|---|---|---|---|---|---|---|---|---|---|---|---|---|---|
| 268B | R1 | 111.6 | 16.8 | 0.00 | | A | 30 | | 36.6 | 375 | 0 | 0.008 | 51.2 | 24.8 | 0 | 13962 | 98.6 | 198 | 2.01 | 2.26 | 223 | 1.123 |
| | R2 | 155.1 | 48.6 | 4.69 | | | 80 | | 120 | 0 | 25.1 | | 52.1 | 25.5 | 29 | 19411 | | | | | | |
| | Total | 266.6 | 35.3 | 2.73 | 26.9 | | | | 157 | 375 | 25.1 | | 58.5 | 44.7 | 29 | 33373 | | | | | | |
| 272A | R1 | 134 | 32.9 | 4.06 | | B | 30 | 0.013 | 55.2 | 154 | 20 | 0.0066 | 76.6 | 56 | 27.2 | 20453 | 92.9 | 199 | 2.14 | 2.34 | 217 | 1.09 |
| | R2 | 80.48 | 79.5 | 4.59 | | | 75 | | 100 | 32.4 | 7.02 | | 54 | 60.9 | 17.1 | 12287 | 46.9 | 95.1 | 2.03 | 1.96 | 91.8 | 1.96 |
| | Total | 214.4 | 50.4 | 4.26 | 10.3 | | | | 155 | 186 | 27.0 | | 66.6 | 54.6 | 33.8 | 32740 | 54.7 | 106.0 | 1.94 | 1.89 | 104 | 1.89 |
| 307C | R1 | 205.9 | 10.4 | 4.05 | | A | 60 | | 15 | 360 | 0 | 0.0084 | 143 | 51.3 | 0 | 24662 | | | | | | |
| | R2 | 252.8 | 58.3 | 2.23 | | | 80 | | 234 | 42 | 12.9 | | 62.1 | 65 | 79.3 | 30279 | | | | | | |
| | Total | 458.8 | 36.8 | 2.23 | 9.4 | | | | 249 | 402 | 12.9 | | 66.3 | 70.5 | 79.3 | 54941 | | | | | | |
| 318C | R1 | 177.7 | 68.7 | 0.00 | | A | 62 | 0 | 132 | 104 | 0 | 0.0057 | 92.4 | 53.5 | 0 | 31170 | | | | | | |
| | R2 | 92.1 | 5.32 | 0.00 | | | 75 | 0 | 0 | 486 | 0 | | 49 | 0.9 | 0 | 16150 | | | | | | |
| | Total | 269.7 | 47.1 | 0.00 | 15.2 | | | | 132 | 590 | 0 | | 96.1 | 24.2 | 0 | 47320 | 61.1 | 142.0 | 2.32 | 2.42 | 148 | 1.04 |
| 320C | R1 | 104.9 | 72.9 | 5.66 | | B | 62 | 0.003 | 108 | 71.5 | 17.5 | 0.006 | 66.8 | 37.5 | 34.0 | 17478 | | | | | | |
| | R2 | 151.6 | 30.9 | 3.05 | | | 91 | 0 | 15 | 243 | 0 | | 89.3 | 15.7 | 40.2 | 25269 | | | | | | |
| | Total | 256.5 | 48.1 | 4.12 | 11.8 | | | | 123 | 315 | 17.5 | | 96.1 | 40.6 | 60.6 | 42746 | 42.2 | 252 | 5.98 | 6.40 | 270 | 1.07 |
| 293A | R1 | 126.3 | 31 | 0.00 | | B | 30 | 0 | 60 | 165 | 0 | 0.005 | 65.2 | 52.8 | 0 | 25105 | 235 | 562 | 2.39 | 2.45 | 576 | 1.02 |
| | R2 | 173.4 | 64.5 | 0.00 | | | 75 | 0 | 100 | 32.4 | 0 | | 92.6 | 101.5 | 0 | 34470 | | | | | | |
| | Total | 299.7 | 50.4 | 0.00 | 33 | | | | 160 | 197 | 0 | | 94.4 | 75.3 | 0 | 59575 | | | | | | |

TABLE 3

SERIES REACTOR BLEND COMPOSITION

| Polymer | Components | Poly Split | C2 wt % | ENB wt % | DSC Tm (° C.) | DSC/Hf J/g |
|---|---|---|---|---|---|---|
| A Blend | | | 45.68 | 3.35 | 127 | 30 |
| m-iPP | Reactor 1 | 46.5 | 0 | 0 | 133 | 74 |
| m-EPDM | Reactor 2 | 53.5 | 85.4 | 6.27 | | |
| B Blend | | | 46.09 | 4.33 | 128 | 25 |
| m-iPP | Reactor 1 | 38.76 | 0 | 0 | 134 | 73 |
| m-EPDM | Reactor 2 | 61.24 | 75.3 | 7.07 | | |

TABLE 4

PROPERTIES OF DYNAMIC VULCANIZATES

| | 1 | 2 | 3 | 4 | Prior Art | |
|---|---|---|---|---|---|---|
| Profax ® 6723 | | | | | 60 | 60 |
| Epsyn ® 70A | | | | | 100 | 100 |
| 363 A | | | | | | |
| i-PP | 86.9 | 86.9 | | | | |
| EPDM | 100 | 100 | | | | |
| 363B | | | | | | |
| i-PP | | | 63.4 | 63.4 | | |
| EPDM | | | 100 | 100 | | |
| Zinc Oxide | — | 2 | — | 2 | — | 2 |
| SnCl$_2$ H$_2$O | — | 1.8 | — | 1.8 | — | — |
| SP-1045 | — | 7.0 | — | 7.0 | — | SP-1056 |
| Hardness, Shore | 37 | 44D | 45D | 44D | 36D | 42D |
| UTS, psi | 1812 | 4601 | 4061 | 4371 | 1560 | 3463 |
| Elongation, % | 600 | 551 | 525 | 506 | 300 | 310 |
| M$_{100}$, psi | 1059 | 1142 | 1151 | 1147 | 866 | 1433 |

Profax ® 6723 from Montell - Isotactic PP of 0.8 MFR
Epsyn ® 70A, EPDM from DSM Copolymer

What is claimed is:

1. A method of making a copolymer blend by solution polymerization comprising:
   (a) feeding a first set of at least two different monomers and a solvent in controlled proportions to a first continuous flow stirred tank reactor;
   (b) adding a metallocene catalyst to the first reactor;
   (c) operating the first reactor to polymerize the first set of monomers to produce an effluent containing a first copolymer;
   (d) feeding the effluent of (c) to a second continuous flow stirred tank reactor;
   (e) feeding a second set of at least two different monomers in controlled proportions to the second reactor and optionally additional solvent; and
   (f) operating the second reactor to polymerize the second set of monomers to produce a second copolymer,
   wherein the monomers of the first and second set of monomers are selected from the group consisting of ethylene, higher alpha-olefins and non-conjugated dienes and wherein the monomer proportions in the first reactor and the second reactor are controlled so that the first copolymer has 0 to 85 wt % ethylene, the second copolymer has 0 to 85 wt % ethylene, and the copolymer blend has 6 to 85 wt % ethylene; and
   wherein 50–100 wt % of the total amount of catalyst added to all reactors is added to the first reactor.

2. The method of claim 1, wherein the monomer proportions in the first reactor and the second reactor are controlled so that the ethylene content of the first and second copolymers differs by 3–75 wt %.

3. The method of claim 1, wherein at least 35 wt % of the total copolymer blend is made in the second reactor.

4. The method of claim 1, wherein the monomer proportions in the first reactor and the second reactor are controlled so that the ethylene content of the first and second copolymers differs so that either: (a) the first copolymer is semi-crystalline and the second copolymer is amorphous, or (b) the first copolymer is amorphous and the second copolymer is semi-crystalline.

5. The method of claim 1, wherein the molecular weight of the first or second copolymer or both copolymers is controlled by at least one of: (a) adding a chain transfer agent to the first or second reactor or both reactors, and (b) operating the first and second reactors with a temperature difference between the reactors.

6. The method of claim 5, wherein the molecular weight of the first or second copolymer or both copolymers is controlled so that each of the first and second copolymers has a Mw/Mn of 1.7–2.5 while the copolymer blend has a Mw/Mn of 2.5–20.0.

7. The method of claim 1, wherein each of the first and second copolymers has a weight average molecular weight of 10,000–2,000,000.

8. The method of claim 5, wherein the molecular weight of the first or second copolymer or both copolymers is controlled so that the copolymer blend has a Mw/Mn of less than 2.5.

9. The method of claim 8, wherein the monomer proportions in the first reactor and the second reactor are controlled so that the ethylene content of the first and second copolymers differs by 3–75 wt %.

10. The method of claim 5, wherein the molecular weight of the first or second copolymer or both copolymers is controlled so that either: (a) the first copolymer has a higher molecular weight than the second copolymer or (b) the first copolymer has a lower molecular weight than the second copolymer.

11. The method of claim 10, wherein the monomer proportions in the first reactor and the second reactor are controlled so that the first copolymer has a different ethylene content from the second copolymer.

12. The method of claim 1, wherein the monomer proportions in the first reactor and the second reactor are controlled so that one of the copolymers comprises propylene and 0 to 20 wt % ethylene, is semi-crystalline due to the presence of isotactic propylene sequences, and has a melting point of 40–160° C., while the other copolymer is amorphous.

13. The method of claim 12, wherein the amorphous copolymer is a terpolymer containing 1–10 wt % diene.

14. The method of claim 1, wherein the monomer proportions in the first reactor and the second reactor are controlled so that one of the copolymers comprises propylene and 0 to 20 wt % ethylene, is semi-crystalline due to the presence of isotactic propylene sequences, and has a melting point of 40–160° C., while the other copolymer is a terpolymer containing 60–85 wt % ethylene, 1–10 wt % diene, and is semi-crystalline due to the presence of ethylene crystallinity.

15. The method of claim 1, wherein the monomer proportions in the first reactor and the second reactor are controlled so that one of the copolymers contains 60 to 85 wt % ethylene, is semi crystalline due to the presence of ethylene sequences, and has a melting point of 40–100° C., while the other copolymer is amorphous.

16. The method of claim 1, wherein the non-conjugated diene is selected from the group consisting of 5-ethylidene-2-norbornene (ENB), 1,4-hexadiene, dicyclopentadiene (DCPD), norbornadiene, 5-vinyl-2-norbomene (VNB), and mixtures thereof.

17. The method of claim 1, wherein the reactors are liquid filled, stirred tank reactors, continuous flow, in series.

18. The method of claim 1, wherein the metallocene catalyst is a group 4, 5, or 6 metallocene catalyst activated by methylalumoxane or a non-coordinating anion.

19. The method of claim 1, wherein the metallocene catalyst is selected from the group consisting of $\mu$-$(CH_3)_2$Si$(Indenyl)_2$Hf$(CH_3)_2$, $\mu$-$(CH_3)_2$Si[tetramethylcyclopentadienyl][adamantylamido]Ti$(CH_3)_2$, and $\mu$-$(C_6H_5)_2$Si[cyclopentadienyl][flourenyl]Hf$(CH_3)_2$.

20. The method of claim 1 wherein the first reactor operates at temperatures of 0 to 100° C. and the second reactor operates at temperatures of 40 to 140° C.

21. The method of claim 1, wherein the reactors are adiabatic.

22. The method of claim 1, wherein the method is carried out under homogeneous solution phase conditions.

23. A method of making a copolymer blend by homogeneous solution phase polymerization, the method comprising:
   (a) copolymerizing a first set of monomers comprising ethylene and a $C_3$ to $C_8$ alpha-olefin in a first continuous flow stirred tank reactor, in the presence of a metallocene catalyst, to form an effluent comprising a first copolymer;
   (b) directing the effluent to a second continuous flow stirred tank reactor in series with the first reactor; and
   (c) copolymerizing a second set of monomers comprising ethylene and a $C_3$ to $C_8$ alpha-olefin in the second reactor, in the presence of a metallocene catalyst and the effluent from the first reactor, to form a blend of a second copolymer and the first copolymer, the polymer blend comprising from 6 to 85 wt % ethylene.

24. The method of claim 23, wherein at least one of the first and second reactors is adiabatic.

25. The method of claim 23, wherein the blend has a Mw/Mn ratio of less than 2.5, the first and second copolymers have different amounts of ethylene, and the amounts differ by from 3 to 75 wt % ethylene.

26. The method of claim 25, wherein the amounts of ethylene differ by from 5 to 60 wt % ethylene.

27. The method of claim 25, wherein the amounts of ethylene differ by from 7 to 50 wt % ethylene.

28. The method of claim 23, wherein one of the copolymers is semi-crystalline, and the other copolymer is amorphous.

29. The method of claim 28, wherein the semi-crystalline copolymer is an ethylene-propylene copolymer comprising greater than 60 wt % ethylene, and the crystallinity is due to ethylene sequences.

30. The method of claim 28, wherein the semi-crystalline copolymer is an ethylene-propylene copolymer comprising less than 20 wt % ethylene, and the crystallinity is due to isotactic propylene sequences.

31. The method of claim 28, wherein the amorphous copolymer is an ethylene-propylene copolymer comprising from 20 to 60 wt % ethylene.

32. The method of claim 23, wherein the first set of monomers further comprises a non-conjugated diene, and the first copolymer comprises from 2–12 wt % of diene-derived units.

33. The method of claim 23, wherein the second set of monomers further comprises a non-conjugated diene, and the second copolymer comprises from 2–12 wt % of diene-derived units.

34. The method of claim 23, wherein each of the first and second copolymers has a ratio Mw/Mn of less than 2.5 and the copolymer blend has a ratio Mw/Mn of 2.5 to 20.

35. The method of claim 33, wherein the Mw/Mn of the blend is 3.0 to 10.0.

36. The method of claim 23, wherein the metallocene catalyst is selected from the group consisting of $\mu$-$(CH_3)_2$Si$(Indenyl)_2$Hf$(CH_3)_2$, $\mu$-$(CH_3)_2$Si(tetramethylcyclopentadienyl)(adamantylamido)Ti$(CH_3)_2$, and $\mu$-$(C_6H_5)_2$Si(cyclopentadienyl)(fluorenyl)Hf$(CH_3)_2$.

37. A method of making a blend of ethylene-propylene copolymers by homogeneous solution phase polymerization, the method comprising:
   (a) copolymerizing a first set of monomers comprising ethylene and propylene in a first adiabatic continuous flow stirred tank reactor, in the presence of a metallocene catalyst, to form an effluent comprising a first ethylene-propylene copolymer;
   (b) directing the effluent to a second adiabatic continuous flow stirred tank reactor in series with the first reactor;
   (c) copolymerizing a second set of monomers comprising ethylene and propylene in the second reactor, in the presence of a metallocene catalyst and the effluent from the first reactor, to form a blend of a second ethylene-propylene copolymer and the first copolymer, the copolymer blend comprising from 6 to 85 wt % ethylene.

38. The method of claim 37, wherein the blend has a Mw/Mn ratio of less than 2.5, the first and second copolymers have different amounts of ethylene, and the amounts differ by from 3 to 75 wt % ethylene.

39. The method of claim 37, wherein one of the copolymers is semi-crystalline, and the other copolymer is amorphous.

40. The method of claim 39, wherein the semi-crystalline copolymer comprises greater than 60 wt % ethylene, and the crystallinity is due to ethylene sequences.

41. The method of claim 39, wherein the semi-crystalline copolymer comprises less than 20 wt % ethylene, and the crystallinity is due to isotactic propylene sequences.

42. The method of claim 39, wherein the amorphous copolymer comprises from 20 to 60 wt % ethylene.

43. The method of claim 37, wherein the first set of monomers further comprises a non-conjugated diene, and the first copolymer comprises from 2–12 wt % of diene-derived units.

44. The method of claim 37, wherein the second set of monomers further comprises a non-conjugated diene, and the second copolymer comprises from 2–12 wt % of diene-derived units.

45. The method of claim 37, wherein each of the first and second copolymers has a ratio Mw/Mn of less than 2.5 and the copolymer blend has a ratio Mw/Mn of 2.5 to 20.

46. The method of claim 37, wherein the metallocene catalyst is selected from the group consisting of $\mu\text{-}(CH_3)_2Si(Indenyl)_2Hf(CH_3)_2$, $\mu\text{-}(CH_3)_2Si(tetramethylcyclopentadienyl)(adamantylamido)Ti(CH_3)_2$, and $\mu\text{-}(C_6H_5)_2Si(cyclopentadienyl)(fluorenyl)Hf(CH_3)_2$.

47. The method of claim 1, wherein the metallocene catalyst comprises two cyclopentadienyl ring systems locked into a rigid configuration through a bridging group.

48. The method of claim 23, wherein the metallocene catalyst comprises two cyclopentadienyl ring systems locked into a rigid configuration through a bridging group.

49. The method of claim 37, wherein the metallocene catalyst comprises two cyclopentadienyl ring systems locked into a rigid configuration through a bridging group.

50. A method of making a copolymer blend by solution polymerization comprising:

(a) feeding a first set of at least two different monomers and a solvent in controlled proportions to a first continuous flow stirred tank reactor;

(b) adding a metallocene catalyst to the first reactor, wherein the metallocene catalyst comprises two cyclopentadienyl ring systems locked into a rigid configuration through a bridging group;

(c) operating the first reactor to polymerize the first set of monomers to produce an effluent containing a first copolymer;

(d) feeding the effluent of (c) to a second continuous flow stirred tank reactor;

(e) feeding a second set of at least two different monomers in controlled proportions to the second reactor and optionally additional solvent; and (f) operating the second reactor to polymerize the second set of monomers to produce a second copolymer, wherein the monomers of the first and second set of monomers are selected from the group consisting of ethylene, higher alpha-olefins and non-conjugated dienes and wherein the monomer proportions in the first reactor and the second reactor are controlled so that the first copolymer has 0 to 85wt% ethylene, the second copolymer has 0 to 85wt% ethylene, and the copolymer blend has 6 to 85wt% ethylene; and wherein 50–100wt% of the total amount of catalyst added to all reactors is added to the first reactor.

51. A method of making a copolymer blend by homogeneous solution phase polymerization, the method comprising:

(a) copolymerizing a first set of monomers comprising ethylene and a $C_3$ to $C_8$ alpha-olefin in a first continuous flow stirred tank reactor, in the presence of a metallocene catalyst comprising two cyclopentadienyl ring systems locked into a rigid configuration through a bridging group, to form an effluent comprising a first copolymer;

(b) directing the effluent to a second continuous flow stirred tank reactor in series with the first reactor; and (c) copolymerizing a second set of monomers comprising ethylene and a $C_3$ to $C_8$ alpha-olefin in the second reactor, in the presence of a metallocene catalyst comprising two cyclopentadienyl ring systems locked into a rigid configuration through a bridging group and the effluent from the first reactor, to form a blend of a second copolymer and the first copolymer, the polymer blend comprising from 6 to 85wt% ethylene.

52. A method of making a blend of ethylene-propylene copolymers by homogeneous solution phase polymerization, the method comprising:

(a) copolymerizing a first set of monomers comprising ethylene and propylene in a first adiabatic continuous flow stirred tank reactor, in the presence of a metallocene catalyst comprising two cyclopentadienyl ring systems locked into a rigid configuration through a bridging group, to form an effluent comprising a first ethylene-propylene copolymer;

(b) directing the effluent to a second adiabatic continuous flow stirred tank reactor in series with the first reactor;

(c) copolymerizing a second set of monomers comprising ethylene and propylene in the second reactor, in the presence of a metallocene catalyst comprising two cyclopentadienyl ring systems locked into a rigid configuration through a bridging group and the effluent from the first reactor, to form a blend of a second ethylene-propylene copolymer and the first copolymer, the copolymer blend comprising from 6 to 85wt% ethylene.

* * * * *